United States Patent

[11] 3,621,121

| [72] | Inventors | Robert Roy Eckenbrecht<br>East Bethany, N.Y.;<br>Benton Boyd Scott, Tempe, Ariz. |
|---|---|---|
| [21] | Appl. No. | 11,171 |
| [22] | Filed | Feb. 13, 1970 |
| [45] | Patented | Nov. 16, 1971 |
| [73] | Assignee | GTE Sylvania Incorporated |

[54] CONTINUOUS ELECTRONIC FILM SCANNER
10 Claims, 8 Drawing Figs.

| [52] | U.S. Cl. | 178/5.2 D,<br>178/6.7 A |
|---|---|---|
| [51] | Int. Cl. | H04n 9/02,<br>H04n 5/86 |
| [50] | Field of Search | 178/5.2, 5.2<br>A, 6.7 A, DIG. 28, 5.2 D |

[56] References Cited
UNITED STATES PATENTS

| 2,922,841 | 1/1960 | Graziano | 178/DIG. 28 |
|---|---|---|---|
| 2,291,723 | 8/1942 | Jensen | 178/DIG. 28 |
| 3,378,635 | 4/1968 | Goldmark et al. | 178/DIG. 28 |

Primary Examiner—Richard Murray
Attorneys—Norman J. O'Malley, Robert E. Walrath and Thomas H. Buffton ABSTRACT: In a visual image display system, apparatus is included for deriving electrical signals representative of image information from a film of film frames, for transporting the film frames through a scanning zone at a predetermined film frame repetition rate, and for effecting continuous modification of electron beam scanning of the film frames at a rate substantially equal to the repetitive rate of film frame movement through the scanning zone.

INVENTORS.
ROBERT R. ECKENBRECHT &
BENTON B. SCOTT
BY Robert E. Walrath
ATTORNEY

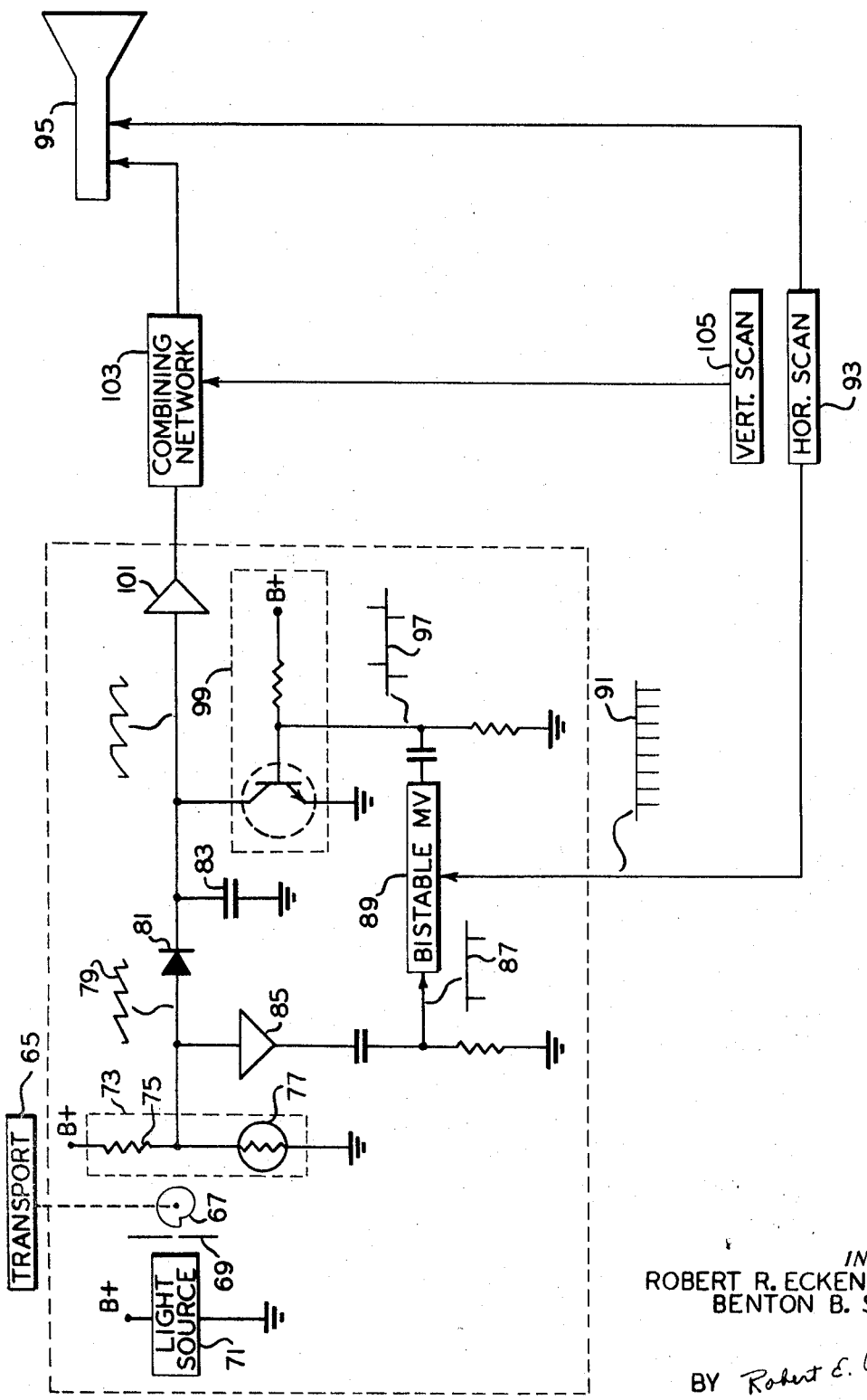

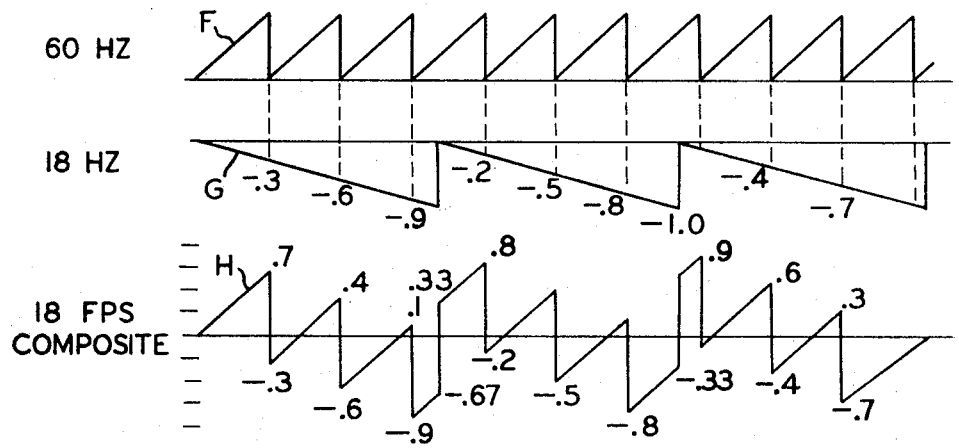
*Fig. 7*
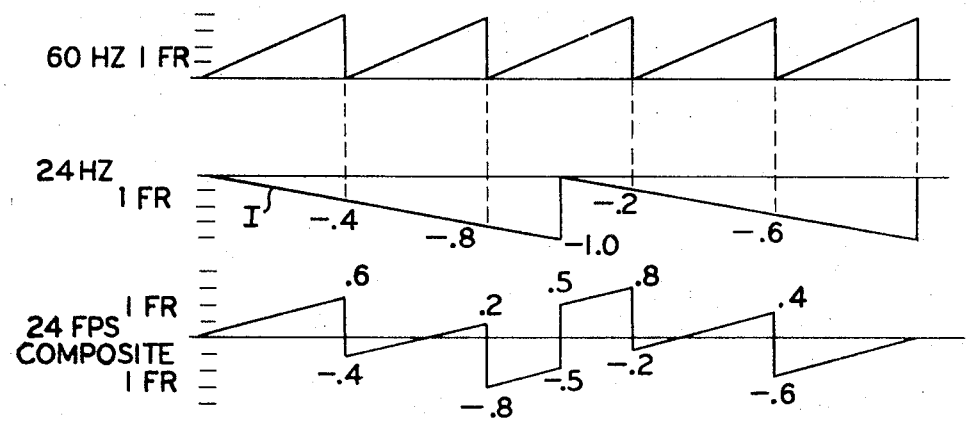
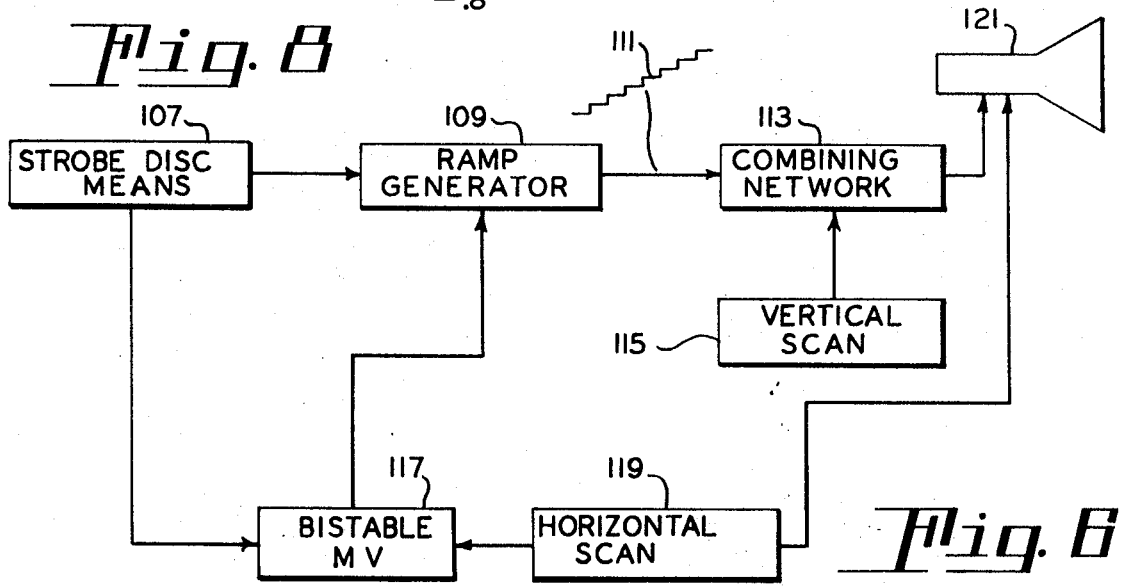
*Fig. 8*

CONTINUOUS ELECTRONIC FILM SCANNER

CROSS REFERENCE TO OTHER APPLICATIONS

Copending application Ser. No. 657,623 filed Aug. 1, 1967 entitled "Color Reproduction System" now PAT. NO. 3,553,352 relates to apparatus for selectively applying signals from first and second signal sources to a color image reproducer to effect a color image display. Also, copending application Ser. No. 787,963 filed Dec. 30, 1968 entitled "Color Image Display System" now U.S. Pat. No. 3,569,612 includes apparatus for transporting film and for developing vertical scan and vertical scan modifying signals for altering the vertical scan as well as apparatus for effecting vertical retrace during a blanking period unobservable to a viewer. Moreover, copending application Ser. No. 787,725 filed Dec. 30, 1968 entitled "Color Image Display System Employing Altered Scanning" provides for modification of the vertical scanning of a flying spot scanner tube such that scanning of a film frame is altered to coincide with movement of the film frames through a film scanning zone rendering the movement unobservable to a viewer.

BACKGROUND OF THE INVENTION

In general, the best known form of color image display system includes a color television camera utilizing an image storage device such as a vidicon, a transmitter, and a color television receiver. The television camera is directed toward a scene or a film wherefrom image signals are derived and transmitted. In turn, the transmitted image signals are intercepted and processed by a television receiver to provide a color image display.

Although such apparatus is suitable for a so-called "commercial" operation such as a television studio, it is obviously rather inappropriate as a "consumer"-type product. In other words, the cost, training, and effort necessary to utilize such apparatus is far beyond the interest and capabilities of an average viewer of television programs.

Other forms of color image display systems include the well-known "flying spot scanner" type of image display wherein a flying spot scanner tube serves as a light source for scanning a film. Also, a light responsive device is disposed adjacent the film and provides electrical signals which are processed to effect development of an image display on a visual display device such as a color television picture tube.

In flying spot scanner systems and more particularly in flying spot scanner systems utilizing movie film which has a plurality of film frames, a major problem is in the area of effecting film immobilization insofar as the viewer of the image display is concerned. Moreover, the fact that the film motion is either intermittent or continuous does not alter the fact that motion compensation must be provided during the unblanked raster scanning period of the flying spot scanner tube which would be visible to a viewer of an associated display device.

Insofar as intermittent film motion systems are concerned, a number of techniques have been employed with various degrees of success. For example, the previously mentioned copending application Ser. No. 787,963 relates to a movie film system wherein film movement is hidden during a period of horizontal overscan and retrace. Also, copending application Ser. No. 787,725 provides a system for modification of the scanning waveform in a manner such that similarity thereof to a waveform depicting the motion of the film during observable periods is achieved.

Moreover, even though such intermittent film motion systems have been utilized with varying degrees of success, it has been found that an intermittent film motion technique does leave something to be desired. More specifically, it has been found that intermittent film motion systems tend to be relatively noisy and to have a deleterious effect upon the film due to the force required to repeatedly overcome the inertia of a stationary film.

As to continuous film motion systems, one known system is the so-called lap-dissolve system utilizing a moving prism or lens system. Therein, one scene gradually disappears as the next scene gradually appears. Also, rotating prisms and mirror-type optical systems have been employed in an attempt to effect immobilization of a film.

However, all of the above-mentioned continuous film motion systems are of a type which might be referred to as optical in contrast to electronic. Moreover, such optical systems have been found to be relatively expensive and undesirably employ different optical paths wherefrom successive film frame images are derived.

As to visual image display systems of the continuous motion type employing a flying spot scanner device and so-called electronic scanning, the best known prior art example is set forth in an article entitled "Continuous All-Electronic Scanner for 16-mm Color Motion-Picture Film" which appeared in the Journal of the SMPTE Volume 62, published in Apr. 1954. Therein, a jump-scan component is added to the standard vertical scanning signals with the "jumps" being various DC levels judiciously controlled for each field scan period. Moreover, five specific DC levels are employed for each two film frames and five complete picture scans resulting in a film motion of about 24 frames per second.

While the above-described apparatus appears to be especially suitable for motion-picture film systems normally employed in a "commercial" type of atmosphere as distinct from a "consumer"-type product, it has been found that such systems are relatively expensive and relatively complex. Moreover, the known apparatus requires trained operators having skills and capabilities beyond those of the amateur or "consumer"type customer.

OBJECTS AND SUMMARY OF THE INVENTION

An object of the present invention is to provide an enhanced color image display system. Another object of the invention is to provide an improved color image display derived from film. Still another object of the invention is to provide improved apparatus for continuous modulation of a vertical scanning raster on a flying spot scanner tube at a rate substantially equal to the rate of continuous film movement through a film scanning zone.

These and other objects and advantages are achieved in one aspect of the invention by apparatus including a flying spot scanner means, transport means associated with the scanner means for continuously moving a film of film frames through a film scanning zone, and a vertical scan modification means coupled to the scanner and transport means for developing vertical scan modification signals having a frequency substantially equal to the rate of film frame movement through the film scanning zone and a continuously varying magnitude.

BRIEF DESCRIPTION OF THE DRAWINGS

FIG. 5 is a form of signal modifying apparatus suitable for use with a film frame repetition rate other than a submultiple of a vertical scanning frequency;

FIG. 6 is an alternative preferred form of signal modifying apparatus employed at a range of film frame rates;

FIGS. 7 and 8 are graphic illustrations of vertical scanning and vertical modification signals wherein the predetermined film frame repetition rates are at 18 and 24 film frames per second.

PREFERRED EMBODIMENT OF THE INVENTION

For a better understanding of the present invention, together with other and further objects, advantages and capabilities thereof, reference is made to the following disclosure and appended claims in connection with the accompanying drawings.

Figure 1:
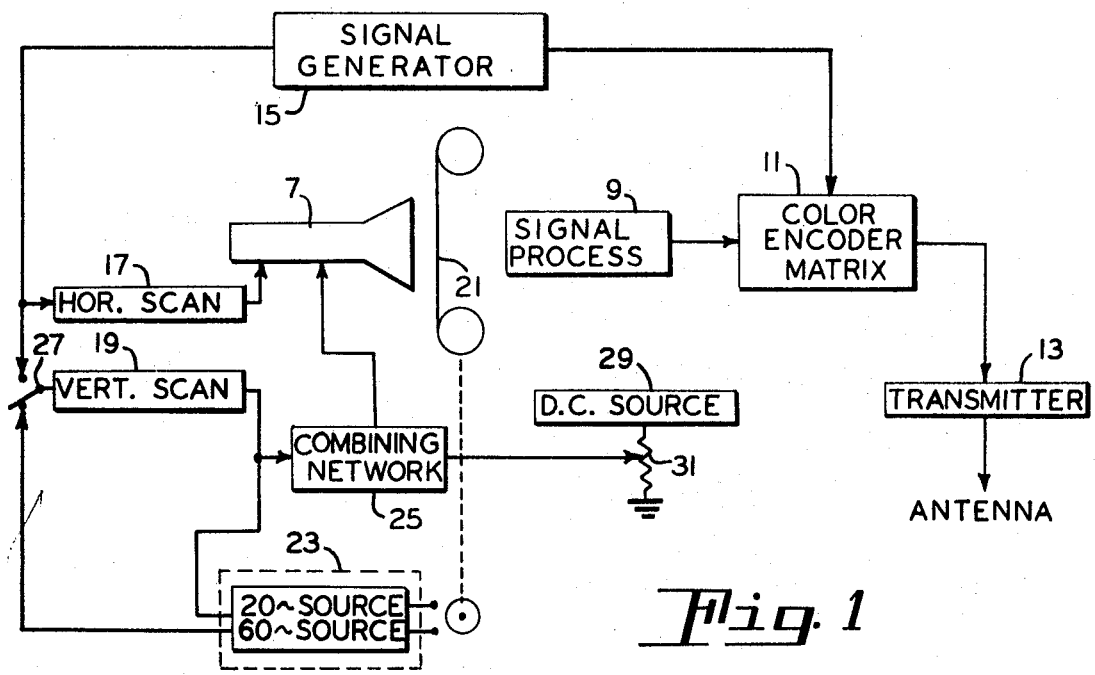
FIG. 1 is an illustration, in block form, of apparatus suitable for deriving color image display signals from a film.

Referring to the drawings, FIG. 1 illustrates a specific form of apparatus suitable to the provision of color image display signals derived from film. Therein, a flying spot scanner system includes a flying spot scanner tube 7 and signal processing circuitry 9 wherefrom signals representative of color information are applied to a matrix and color encoder network 11. The matrix and color encoder network 11 is, in turn, coupled to a transmitter 13 which feeds an antenna.

A signal generator 15 provides signals which are applied to horizontal scan circuitry 17 and vertical scan circuitry 19. Also, the signal generator 15 provides synchronizing, blanking, and subcarrier signals which are applied to the matrix and color encoder network 11 to effect development of a desired composite color signal suitable for transmission.

Associated with the flying spot scanner system is a film scanning zone and a transport means 21 for continuously moving a film of film frames through the film scanning zone at a predetermined rate of film frame movement. This transport means 21 is coupled to a vertical scan modification means 23 wherein vertical scan and vertical scan modifying signals are developed. The vertical scan modifying signals are applied to a signal combining network 25 and a switching means 27 selectively couples vertical signals at a vertical scanning frequency from the scan modification means 23 to the vertical scan circuitry 19 which, in turn, is coupled to the signal combining network 25.

Also, a potential from a DC potential source 29 is coupled by way of an alterable impedance 31 to the signal combining network 25. In turn, signals from the combining network 25 and from the horizontal scan circuitry 17 are applied to the flying spot scanner tube 7 of the flying spot scanner system to effect not only a raster of a horizontal and vertical scanning electron beam but also continuous vertical movement of the raster at a rate substantially equal to the rate of film frame movement through the film scanning zone of the flying spot scanner system.

As to operation, activation of the transport means 21 causes continuous movement of a film of film frames through a film scanning zone. Thereupon, the signal process circuitry 9 provides signals representative of color image information which may be in the form of color difference signals or red, green, and blue color signals for example.

Also, activation of the transport means 21 causes development of both vertical scan signals (60 Hz. in this instance) and vertical scan modifying signals (20 Hz. for instance). The scan modifying signals are applied to a signal combining network 25 and vertical scan signals are selectively applied by the switch 27 depending upon the energization of the transport means. In other words, vertical scanning for the flying spot scanner tube 7 is derived from the scan modification means 23 during operation of the transport means 21. However, viewing of one particular film frame is achieved by discontinuance of movement of the transport means 21 which interrupts development of vertical scan and vertical scan signals by the scan modification means 23. Then, the vertical scan is provided by the vertical scan circuitry 19 via the selecting switch 27.

Figure 2:
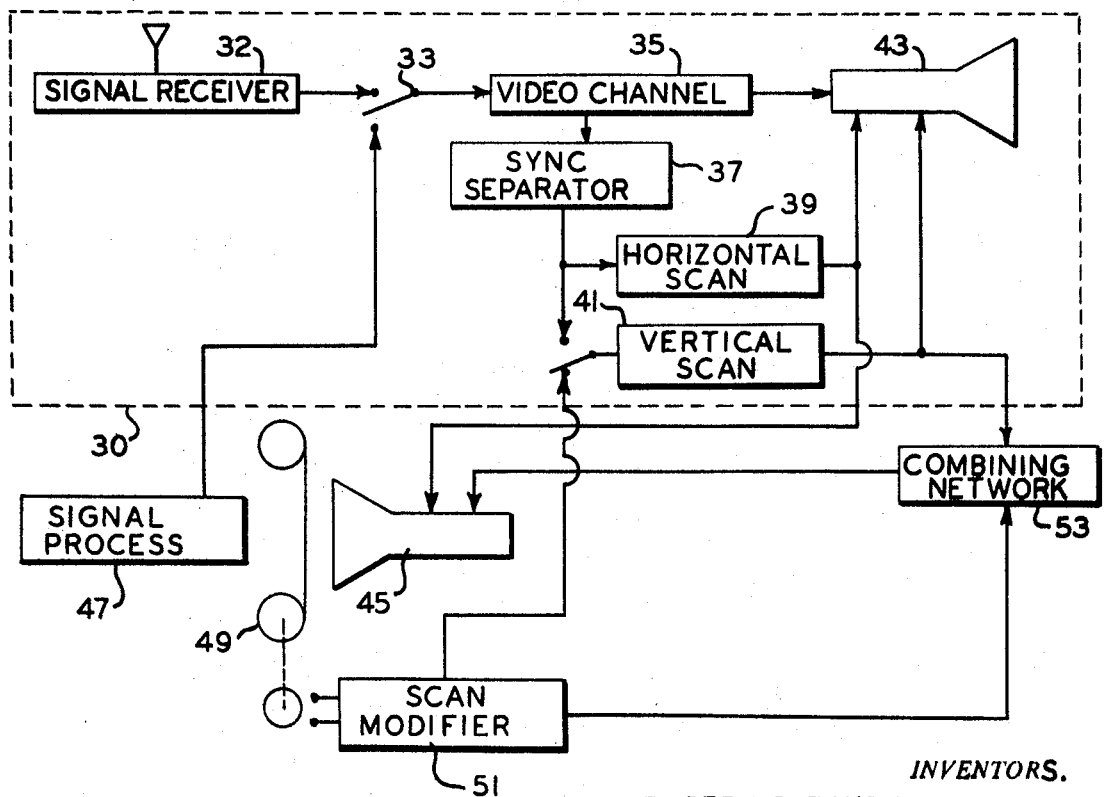
FIG. 2 is an illustration, in block form, of a color image display system suitable for deriving a color image display from film.

Alternatively, FIG. 2 illustrates another form of apparatus suitable to the provision of a color image display. Herein, a color television receiver 30 includes a signal receiver 32 selectively coupled by a switch 33 to a video channel 35. The video channel 35 applies signal to a sync signal separator 37 wherefrom horizontal sync signals are applied to a horizontal scan circuit 39 and wherefrom vertical sync signals are applied to a vertical scan circuit 41. Video signals from the video channel are applied to a display device 43 as are horizontal and vertical scan signals from the scan circuits, 39 and 41 respectively.

A flying spot scanner system includes a flying spot scanner tube 45 and signal processing circuitry 47 coupled to the switch 33 of the television receiver 30. The scanner has a film scanning zone and a transport means 49, associated with the flying spot scanner system, continuously moves a film of film frames through the film scanning zone at a predetermined rate of film frame movement.

Coupled to the transport means 49 is a signal modification means 51 wherein is developed vertical modifying signals having a frequency substantially equal to the predetermined rate of movement of film frames through the film scanning zone and varying in magnitude at a rate substantially equal to the rate of movement of the film frames through the film scanning zone.

This modifying signal from the signal modification means 51 and a vertical scan signal from the vertical scan circuit 41 of the television receiver 30 are applied to a signal combining network 53. In the combining network 53, the vertical scan signal and the vertical modifying signals are combined and applied to the flying spot scanner tube 45 to effect vertical scanning. Also, signals derived from the horizontal scan circuit 39 of the television receiver 30 are applied to horizontal deflection apparatus of the flying spot scanner tube 45.

As to general operation, activation of the transport means 49 causes continuous movement of film having film frames through a film scanning zone of the flying spot scanner at a predetermined film frame rate and frequency. This activated transport means 49 causes development of a modification signal in the signal modification means 51 having a frequency substantially equal to the frequency of the film frame movement and varying in magnitude along a curve substantially coincident with a curve representing film movement through the film scanning zone.

Horizontal scan signals from the horizontal scan circuit 39 are applied to the display device 43 and to the flying spot scanner tube 45. Vertical scan signals from the vertical scan circuit 41 are applied to the display device 43 and to the signal combining network 53. In turn, the vertical scan signals and the modification signals are combined in the combining network 53 and applied to the flying spot scanner tube 45. Thus, the horizontal and vertical scan signals serve to effect a horizontally and vertically scanned raster on the flying spot scanner tube 45 and the modifying signals serve to continuously alter the vertical positional location of the raster in accordance with the vertical positional location of a film frame in the film scanning zone.

More specifically, a relatively simple form of apparatus (FIG. 1) would include a vertical scan modification means 23 wherein is developed a 60 cycle vertical scan signal and a vertical modifying signal having a frequency which is a submultiple of the vertical scan signal such as a 20 cycle signal for instance. Obviously, numerous techniques for developing signals having a vertical frequency and submultiple signals thereof are readily available. For example, reference is made to the previously mentioned copending application Ser. No. 787,725 entitled "Color Image Display System Employing Altered Scanning" wherein a rotatable wheel having a magnet thereon and a gearing arrangement are employed to simultaneously provide both 60 cycle and 20 cycle signals.

Figure 3:
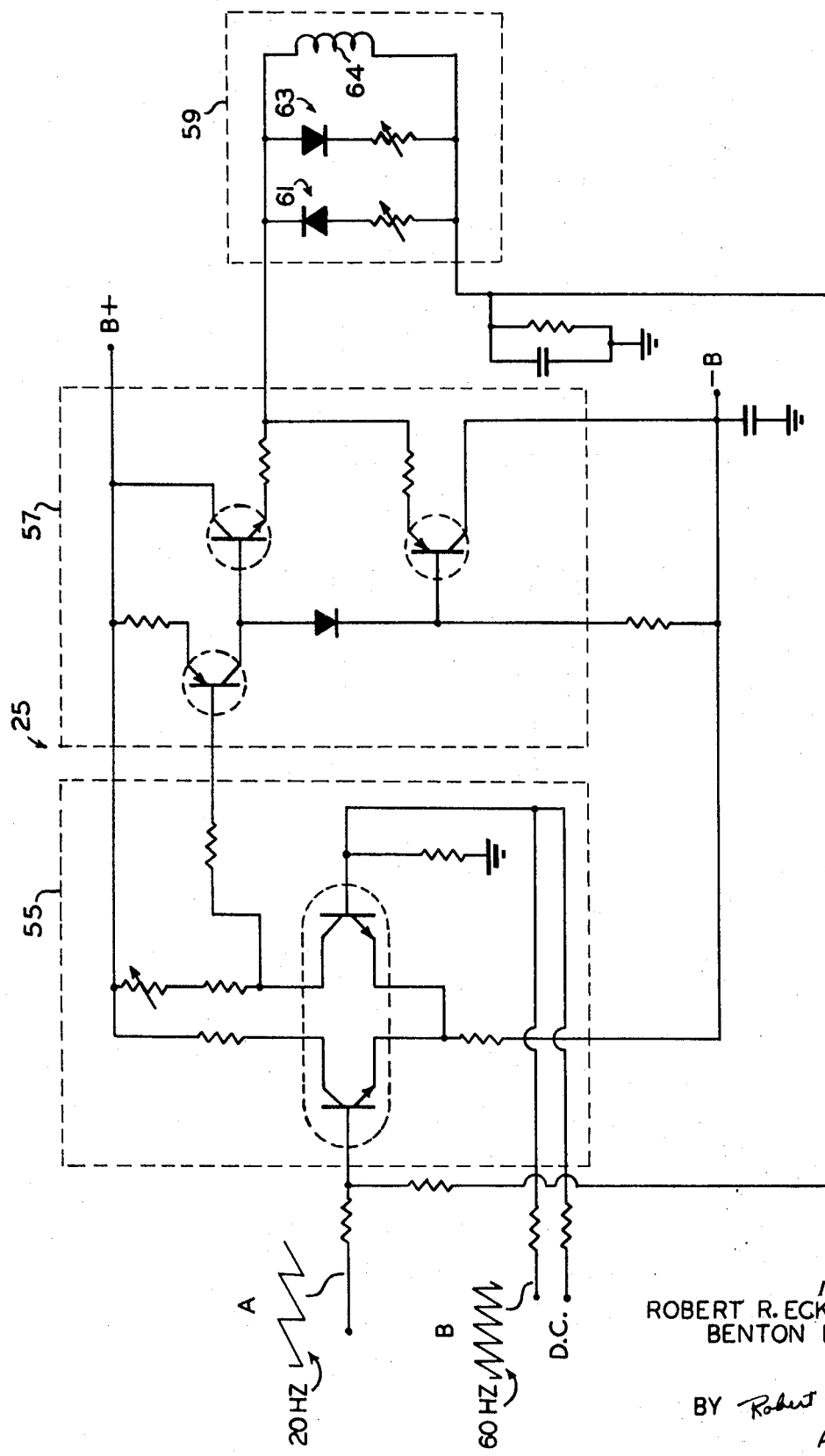
FIG. 3 is a preferred network for combining vertical modification and scanning signals to effect a vertical scanned raster continuously varying in vertical placement.

Having provided a 60 cycle vertical scanning signal, and a 20 cycle vertical modifying signal, a wide band amplifier means, seen in FIG. 3, may be employed to effect the desired combination of signals. Also, a so-called "framing" potential for positional location of the scanning raster is coupled to the combing network 25 from the DC potential source 29 and alterable impedance 31.

As can be seen in FIG. 3, the combining network 25 includes an amplifier stage 55 having a substantially sawtooth-shaped input waveform (Curve A) at a frequency of about 20 Hz. Also, a substantially sawtooth-shaped input waveform (Curve B) at a frequency of about 60 Hz., and a DC potential are applied to the amplifier stage 55 wherein the signals are combined and applied via ordinary driver stages 57 to vertical deflection yoke apparatus 59 associated with the flying spot scanner tube [7 of (FIG. 1)] of the flying spot scanner system. It may also be noted that the deflection yoke apparatus 59 includes a linearity means in the form of a pair of circuits 61 and 63, each having a series connected resistor and diode, oppositely poled and shunting the vertical deflection yoke 64. Thus, nonlinearity at each end of the 20 Hz. vertical scan modification signal due to nonlinear yoke characteristics is compensated for by the above-mentioned linearity means.

Figure 4:
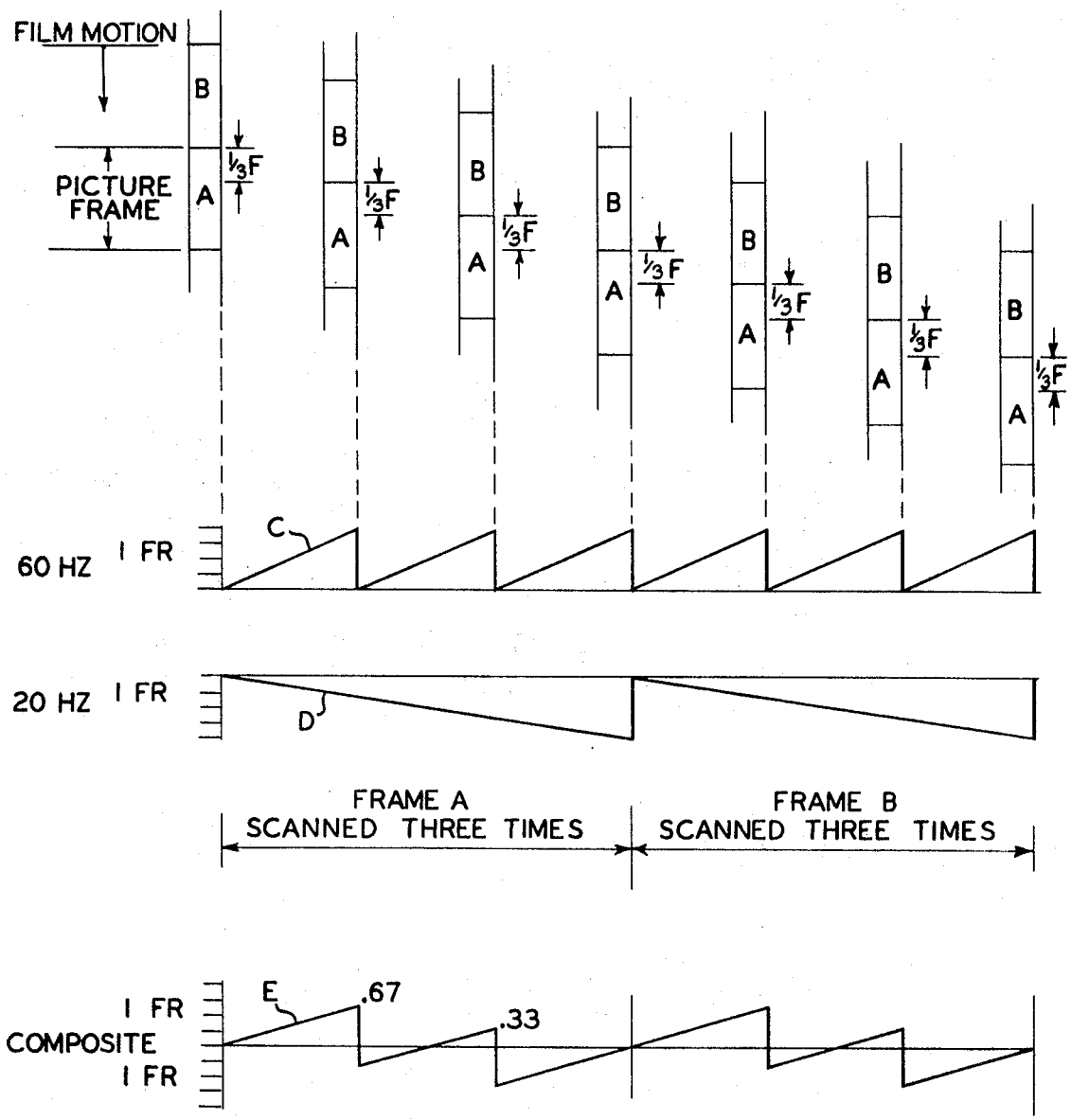
FIG. 4 is a graphic illustration of the combined film frame movement and scanning of a continuously moving film of film frames.

To clarify the operation, reference is made to the graphic illustration of FIG. 4. As can be seen, two film frames, A and B of a continuously moving film, are depicted. Immediately beneath is illustrated a substantially sawtooth-shaped vertical scan signal C having a frequency of 60 Hz. Below the vertical scan signal C is a vertical scan modifying signal D having a frequency of 20 Hz. and continuously varying in magnitude at a rate substantially equal to the rate of film frame movement through a film scanning zone.

Upon combining the vertical scan signal C and the vertical scan modifying signal D, it can be seen that there is provided a combined vertical deflection signal E whereby each film frame is vertically scanned three times and this vertical scanning is positionally altered at the same rate as the movement of the film frame. Moreover, after a frame is vertically scanned three times, the vertical scanning raster is positionally altered and returned to the original positional location during the vertical retrace period. Thus, the vertical scanning of each frame has the same starting position and the return to the starting position after scanning is unobservable to a viewer of an associated display device due to the coincident vertical retrace period of the flying spot scanner tube and the display device.

Although the above-described system has been illustrated as having a continuously moving film frame repetition rate which is about one-third the vertical scan frequency of 60 Hz., it can be readily understood that other submultiple film frame repetition rates, such as 30 Hz. and 15 Hz., are essentially similar in operation. Since the vertical retrace period of the vertical scan signal and of a submultiple vertical modifying signal will occur substantially simultaneously, the return of the scan raster to the original positional location will be unobservable to a viewer.

Additionally, it is well known that present day filming apparatus normally operates at a film frame repetition rate other than a submultiple of the vertical scan frequency of a television receiver. More specifically, most filming apparatus of the continuous film moving type operates at either 18 or 24 film frames per second. Thus, complexity is encountered when an attempt is made to utilize television receiver type apparatus for visually displaying images derived from such film.

However, it has been found that appropriate alterations in the scan modification means permits employment of a so-called continuous chase scan wherein a continuously moving film of film frames is employed. Moreover, such altered scan modification means is readily adapted into the previously mentioned systems for providing a visual image display.

As an illustration of such an altered scan modification means, reference is made to FIG. 5. Herein, a transport means 65 for conveying a film continuously through a film scanning zone (not shown) at a given film frame repetition rate other than at a repetition rate which is a submultiple of the vertical scan frequency (60 Hz.) of a television receiver is coupled to rotatable disc 67. The disc 67 is rotated at the speed of the film frame repetition raster or one revolution for each film frame passing through a film scanning zone.

Immediately adjacent the rotatable disc 67 is a slotted surface 69 behind which is a light source 71 coupled intermediate a potential source B+ and a potential reference level such as circuit ground.

A light sensor 73 including a series connected resistor 75 and photo sensor 77 is disposed on an opposite side of the disc 67. Thus, movement of a film frame through a film scanning zone is accompanied by a single revolution of the disc 67 which causes development of a substantially sawtooth-shaped modification signal 79 having a frequency substantially equal to the film frame repetition rate.

This modification signal 79 is applied via a diode 81 to a charging capacitor 83 and to amplifier stage 85 wherein is developed a pulse signal 87 having a frequency substantially equal to the frequency of the sawtooth-shaped modification signal 79. In turn, the pulse signal 87 is applied to a bistable multivibrator network 89 which also receives a horizontal frequency pulse signal 91, at the horizontal scan frequency of about 15,750 Hz., from a horizontal scan circuit 93 wherefrom horizontal scan signals are also developed and applied to deflection apparatus of a flying spot scanner tube 95.

The bistable multivibrator network 89 provides a differentiated output signal 97 which is applied to a transistor circuit 99 shunting the charging capacitor 83. In turn, the charging capacitor 83 is coupled by an amplifier 101 to a signal combining network 103 which also receives a vertical scan signal at about 60 Hz. from a vertical scan circuit 105. The combining network 103 applies the combined modification and vertical scanning signals to the vertical deflection apparatus of the flying spot scanner tube 95.

As to operation, the transport means 65 continuously moves a film of film frames through a film scanning zone at a given film frame repetition rate. The disc 67, light source 71, and light sensor 73 combine to provide a substantially sawtooth-shaped modification signal 79 having substantially the same frequency as the film frame repetition rate and which charges a charging capacitor 83 via a diode 81.

The bistable multivibrator 89 also receives a pulse signal 87 developed from the modification signal 79 and a horizontal frequency pulse signal 91 which combine to provide a differentiated output signal 97 having a frequency slightly less than the frequency of the modification signal 79 and occurring during the horizontal retrace period of the signals available from the horizontal scan circuit 93. In turn, the differentiated output signal 97 triggers the transistor circuit 99 to provide a discharge path for the charging capacitor 83.

Thus, the horizontally and vertically scanned raster of the flying spot scanner tube 95 is continuously altered vertically at a rate substantially equal to the film frame repetition rate. However, vertical retrace of the altered raster is delayed until a horizontal retrace period occurs. Thus, the raster retrace is unobservable to a viewer since it occurs during the horizontal retrace period at which time the display device is normally blanked rendering any disturbance unobservable to a viewer.

Alternatively, a preferred form of apparatus for effecting vertical scan modification at film frame rates other than at a submultiple of the vertical scanning frequency (60 Hz.) is illustrated in FIG. 6. Therein, a strobe disc means 107 provides a plurality of pulse signals which are applied to a binary counter-type ramp generator 109. In turn, the ramp generator 109 applies a ramplike signal 111, having a frequency directly related to the film frame rate to a signal combining network 113. A vertical scanning signal from a vertical scan circuit 115 is also applied to the signal combining network 113.

Further, the strobe disc means 107 provides a "reset"-type signal having a frequency substantially equal to the predetermined film frame rate which is applied to a bistable multivibrator 117. A horizontal scan circuit 119 provides a signal at the horizontal scan frequency, about 15,750 Hz., which is also applied to the bistable multivibrator 117. In turn, the bistable multivibrator 117 provides a "reset" signal which is applied to the ramp generator 109. Moreover, the combining network 113 and the horizontal scan circuit 119 provide output signals which are applied to deflection apparatus associated with a flying spot scanner tube 121.

As to operation, the strobe-type disc means 107 preferably includes a photo negative of an ordinary strobe disc and has a plurality of peripheral slit counts with an additional "reset" slit. A pair of photo diodes and a light source are disposed on opposite sides of the photo negative which is rotated by a transport means at a rate directly related to the film frame rate. Thus, the photo negative, light source, and one photo diode combine to provide a plurality of signals via the peripheral slit counts which are applied to the ramp generator 109. The photo negative, light source, and other diode combine to provide a signal, by way of the inner "reset" slit, which is applied to the bistable multivibrator 117.

The ramp generator 109 is preferably of a binary counter type wherein the signals developed via the periphery slits of the strobe disc means 107 are added to effect development of a ramplike signal 111. Also, the combining of signals from the strobe disc means 107 and the horizontal scan circuit 119 in the bistable multivibrator 117 provides for a "reset" signal applied to the ramp generator 109 such that alteration of the vertical scanning is effected during a period of horizontal retrace such as described in the previous embodiment. Thus, the alteration in vertical scanning is effected during the period of horizontal retrace when the viewing screen of an associated display device is "blanked" rendering the alteration unobservable to a viewer.

It should be noted that the above-mentioned technique has numerous advantages over other known techniques. For example, development of a ramplike signal from small signal increments, such as indicated by the strobelike disc, greatly reduces the precision required to achieve relatively good linearity of the desired signal as compared with systems wherein the ramp signal is directly developed. Also, the above-mentioned "counter" technique remains registered when the signals thereto are interrupted and resumes the count when the applied signals are resumed. Thus, film frames movement can be stopped and started without deleterious effect insofar as a viewer is concerned.

As an illustration of the employment of film frame repetition rates other than those which are a submultiple of the vertical scanning frequency (60 Hz.) of a television receiver, reference is made to FIGS. 7 and 8. In FIG. 7, a graphic illustration includes the vertical scan signals (Curve F) having a frequency of 60 Hz., the modification signal (Curve G) at a frequency of about 18 Hz. and a composite signal (Curve H) showing the effect of the continuously varying modification signal (Curve G) on the vertical scan signals (Curve F). FIG. 8 is a similar illustration except that the modification signal (Curve I) has a frequency of about 24 Hz. Thus, it can readily be seen that modification signals at frequencies other than submultiple frequencies of the vertical scan rate are appropriate.

There has been provided unique apparatus for effecting a visual color image display derived from film. The apparatus is responsive to a continuously moving film of film frames to effect a raster continuously altered at a rate substantially equal to the film frame repetition rate such that a viewer of associated display apparatus is unaware of any shift in scanning of individual film frames. Moreover, the apparatus is applicable to film frame repetition rates which are submultiples of the vertical scanning frequency and also to film frame repetition rates which are at a frequency other than submultiples of the vertical scanning frequency.

While there has been shown and described what is at present considered the preferred embodiment of the present invention, it will be obvious to those skilled in the art that various changes and modifications may be made therein without departing from the invention as defined by the appended claims.

We claim:

1. Apparatus for deriving from film electrical signals suitable to the provision of a visual display comprising in combination:
   flying spot scanner means including a flying spot scanner tube with associated means for effecting horizontal and vertical electron beam scanning of the scanner tube, an adjacent film scanning zone, and an image detection and processing means;
   transport means associated with said flying spot scanner means for moving a film of film frames through said scanning zone at a continuous and predetermined rate of film frame movement, said film and scanner means effecting development of image information signals;
   vertical scan modification means coupling said transport means to said flying spot scanner means, said vertical scan modification means developing vertical scan modification signals having a frequency substantially equal to said predetermined rate of film frame movement and having a magnitude continuously varying at a rate substantially equal to said continuous rate of film frame movement whereby said scan modification signals effect continuous vertical movement of vertical electron beam scanning at at rate substantially equal to the predetermined rate of film frame movement; and
   a signal combining network coupling said scan modification means and said means for effecting vertical electron beam scanning of said means for effecting horizontal and vertical electron beam scanning of the scanner tube of said flying spot scanner means to said flying spot scanner tube.

2. The combination of claim 1 wherein said predetermined rate of film frame movement is in the range of about 18-24 film frames per second.

3. The combination of claim 1 including a signal combining network coupling said vertical scan modification means to said flying spot scanner means and a switching means for selectively applying vertical scanning signals from said vertical scan modification means and a source of vertical synchronizing signals to said vertical scanning circuitry.

4. The combination of claim 1 wherein said vertical scan modification means includes means coupled to said means for effecting horizontal and vertical electron beam scanning to effect vertical alteration of said vertical electron beam scanning during a period of retrace of horizontal electron beam scanning.

5. The combination of claim 1 wherein said vertical scan modification means includes means for developing a vertical scan modifying signal having a frequency substantially equal to a film frame repetition rate means for storing said vertical scan modifying signal, and means coupled to a horizontal scan signal source for effecting discontinuance of said storage and vertical alteration of said vertical scan modifying signal during a period of horizontal retrace of a signal from said horizontal scan signal source.

6. The combination of claim 1 wherein said vertical scan modification means includes a strobe disc means for developing a plurality of electrical signals related to a predetermined rate of film frame movement and an electrical signal substantially equal to the rate of film frame movement, a counter-type ramp generator coupled to said strobe disc means and responsive to said plurality of electrical signals, a horizontal scan signal generating means, multivibrator means responsive to said electrical signals from said strobe disc means and signals from said horizontal scan signal generating means to effect control of said ramp generator means.

7. Apparatus for providing electrical signals from a film suitable to the development of a color image display on a color television receiver comprising in combination:
   a color television receiver including an image display device and means for developing horizontal and vertical electron beam scanning signals;
   flying spot scanner means having a flying spot scanner tube with associated deflection apparatus coupled to said horizontal and vertical scanning means of said receiver, an adjacent film scanning zone, and image detection and processing means for applying an image signal to said receiver;
   transport means associated with said flying spot scanner means for effecting continuous movement of a film of film frames through said film scanning zone at a predetermined film frame rate;

scan modification means coupled to said means for effecting horizontal and vertical electron beam scanning to effect vertical alteration of said vertical electron beam scanning during a period of retrace of horizontal electron beam scanning and coupled to said transport means for effecting development of a vertical scan modification signal having a frequency substantially equal to said predetermined frequency of film frame movement through a film scanning zone and a magnitude continuously varying at a rate substantially equal to said rate of continuous film frame movement; and combining means coupling signals from said scan modification means and said horizontal and vertical electron beam scanning means to effect continuous vertical movement of electron beam scanning of said flying spot scanner tube at a rate substantially equal to said predetermined film frame rate whereby electron beam scanning of a film frame on said flying spot scanner tube continuously moves at a rate substantially equal to the rate of film frame movement of said film.

8. The combination of claim 7 wherein said scan modification means includes means for developing and storing electrical signals representing vertical scan modifying signals, means coupling said horizontal electron beam scanning signal means to said storing means to effect discontinuance of said vertical scan modifying signal storage at a period of retrace of said horizontal electron beam scanning signals, and means for applying said vertical scan modifying signals to said combining means whereby vertical alterations in scanning of a film frame occur during a period of horizontal retrace and are unobservable to a viewer of an image display on a color television receiver.

9. The combination of claim 7 wherein said scan modification means includes means for developing a vertical scan modifying signal coupled to said signal combining network and means for developing vertical scanning control signals and a switch means for selectively coupling said means for developing vertical scanning control signals from said scan modification means and from a television receiver to said vertical scanning circuitry.

10. The combination of claim 7 wherein said scan modification means includes strobe disc means for developing a plurality of signals related to a film frame rate and a signal substantially equal to the film frame rate, ramp generator means for developing a ramp signal from said plurality of signals, bistable multivibrator means coupled to said strobe disc means and a horizontal scan signal means for developing and applying a reset signal to said ramp generator means to effect vertical alteration of scanning during a period of horizontal retrace and blanking.

* * * * *